United States Patent [19]

Progar et al.

[11] 4,065,345

[45] Dec. 27, 1977

[54] POLYIMIDE ADHESIVES

[75] Inventors: Donald J. Progar, Grafton; Vernon L. Bell, Seaford; Terry L. St. Clair, Poquoson, all of Va.

[73] Assignee: The United States of America as represented by the United States National Aeronautics and Space Administration, Washington, D.C.

[21] Appl. No.: 734,901

[22] Filed: Oct. 22, 1976

Related U.S. Application Data

[63] Continuation-in-part of Ser. No. 532,784, Dec. 16, 1974, abandoned.

[51] Int. Cl.[2] .................. C08K 5/06; C08L 79/08; C09J 3/00; C09J 5/06
[52] U.S. Cl. .................................. 156/309; 156/331; 260/30.4 N; 260/33.2 R; 260/32.6 NT; 260/33.4 R
[58] Field of Search .............. 260/30.4 N, 33.2 R; 156/309, 331

[56] References Cited

U.S. PATENT DOCUMENTS

| | | | |
|---|---|---|---|
| 3,347,808 | 10/1967 | Lavin et al. | 260/32.6 NT |
| 3,652,511 | 3/1972 | Vincent et al. | 260/78 SC |
| 3,699,075 | 10/1972 | Lubowitz | 260/30.4 N |
| 3,705,870 | 12/1972 | Darmory et al. | 260/30.4 N |

FOREIGN PATENT DOCUMENTS

| | | | |
|---|---|---|---|
| 1,256,203 | 2/1961 | France | 260/32.6 NT |

*Primary Examiner*—Allan Lieberman
*Attorney, Agent, or Firm*—Howard J. Osborn; Wallace J. Nelson; John R. Manning

[57] ABSTRACT

A process of preparing aromatic polyamide-acids for use as adhesives by reacting an aromatic dianhydride to an approximately equimolar amount of an aromatic diamine in a water or lower alkanol miscible ether solvent and wherein the polyamide-acids are converted to polyimides by heating to the temperature range of 200° – 300° C. and wherein the polyimides are thermally stable and insoluble in ethers and other organic solvents.

6 Claims, No Drawings

POLYIMIDE ADHESIVES

ORIGIN OF THE INVENTION

This invention was made by employees of the National Aeronautics and Space Administration and may be manufactured and used by or for the Government of the United States without the payment of any royalties thereon or therefor.

This is a continuation-in-part of application Ser. No. 532,784, filed Dec. 16. 1974, and now abandoned.

BACKGROUND OF THE INVENTION

This invention relates generally to the preparation of useful adhesives and more particularly to the preparation of aromatic polyimide adhesives which have excellent bonding characteristics of and excellent retention of properties at elevated temperatures.

Adhesive bonding is a well known method for joining similar and dissimilar materials. However, the advent of materials, both metallic and nonmetallic, which are capable of withstanding high temperatures, has generated a subsequent need for adhesives for bonding the advanced materials. The increased use of titanium and thermally resistant composites in particular for applications such as in aircraft structural components has led to the investigation of polyimides as base ingredients for adhesive formulations. The aromatic polyimides have the best thermal stability, but do not give satisfactory adhesion of the joints. Some modifications have been made to the polyimides which result in improved adhesive strengths, but those modifications are generally made so that a sacrifice in the long-term thermal stability of the adhesive resin results.

Accordingly, it is an object of this invention to provide a process for preparing and using aromatic polyimides as adhesives for bonding metals, and fiber-reinforced organic resin composites such that high bonding strengths result with no significant loss in thermooxidative stability of the adhesive resin.

A further object of this invention is to provide a process for preparing polyimide adhesives which will retain a high proportion of their adhesive strength when formulated with various additives and when tested at elevated temperatures.

BRIEF DESCRIPTION OF THE INVENTION

The process for producing the polymers for use as adhesives according to the present invention broadly involves the addition of an equimolar quantity of a suitable aromatic dianhydride to a stirred solution of an appropriate aromatic diamine (or equivalent mixtures of two or more appropriate diamines) in certain water- or alcohol-miscible ether solvents. In certain instances, a highly viscous polyamic-acid intermediate polymer precipitates from the ether solvents. The addition of very small amounts of water or alcohol generally leads to redissolution of the polyamic-acid to give a viscous polymer solution. In certain other instances, depending upon the choice of monomers, the polyamic-acid intermediate polymer does not become insoluble, but instead a smooth, viscous polymer solution is formed directly.

These polyamic-acid polymers are characterized by a recurring unit with the following structural formula:

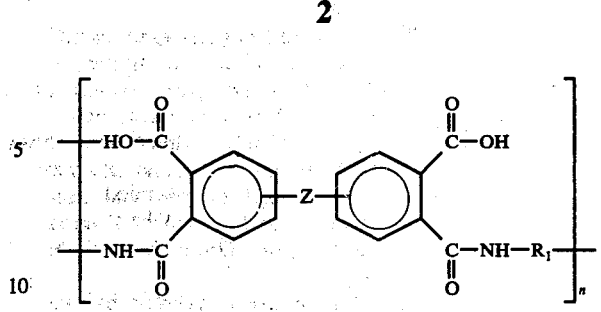

where,
Z is selected from the group consisting of:

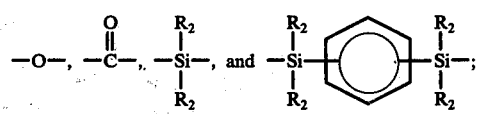

$R_2$ being selected from the alkyl and aryl groups;

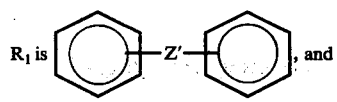

$Z'$ being selected from $-\overset{O}{\underset{\|}{C}}-$, and $-SO_2-$.

The choice of diamines and dianhydrides inappropriate for this process is signaled by failure of one or both monomers to dissolve in the ether solvents. Further failure is caused by a mismatch between the rate of polymerization of the reactants and the rate of precipitation of the polymer, such that the incompletely reacted insoluble monomer can be coated by precipitating polymer and thus inactivated before the completion of the polymerization. A third failure results when the solubility of the polyamic-acid intermediate polymer is such that it precipitates from solution, usually as a powder, before a suitable degree of polymerization has been reached.

The solvents useful for this process are of the aliphatic acyclic and cyclic ether types, such as tetrahydrofuran, m- and p-dioxane, 1,2, dimethoxyethane or monoglyme, bis(2-methoxyethyl)-ether or diglyme, 1,2,bis(2-methoxyethoxy)ethane, or triglyme and bis[2-(2-methoxyethoxy) ethyl]ether or tetraglyme. Such solvents have a high affinity for the polar chemical groups of the aromatic polyamic-acid intermediates, in contrast to the aromatic water-immisicible solvents such as anisole and diphenyl ether.

The polyamic-acid solutions so obtained can then be applied to suitably prepared substrate surfaces, either as neat adhesive resins or in various formulations with fillers, thickeners, etc., and with or without supports such as glass fabric. When the substrates are allowed to stand to allow some or all of the solvent to evaporate, the treated surfaces to be bonded are assembled together by means of clamps or in a press. Heat is applied, which completes the evaporation of solvent and leads to the conversion of the intermediate polyamic-acid to the more thermally resistant cyclic polyimide, during the course of which the excellent bonding of the substrates occurs. Although the bonding cycle can be varied over a wide range of time, temperatures, and pressure, a typical bonding operation would initially involve the drying of the primed surfaces in air at room temperature. This would be followed by bonding of the joint at pressures from 30 to 200 psi with thermal treatment of the joint, under bonding pressure, up to temperatures of 200° to 300° C. Times of 1 hour or more, at temperature and pressure, suffice to post-cure the bonded joint. Thus, minor adjustments of the process make it suited for autoclaving or vacuum-bag operations, in addition to clamp or press bonding.

The polyamic-acid solutions are converted by the heating described to yield polyimide adhesive resins which are characterized by a recurring unit with the following structural formula:

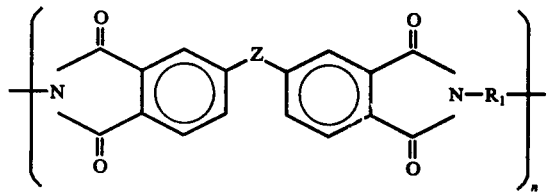

where,
Z is selected from the group consisting of:

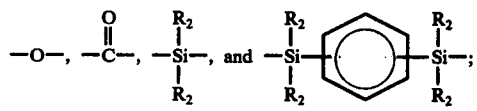

$R_2$ being selected from $CH_3$, $C_2H_5$ and $C_6H_5$;

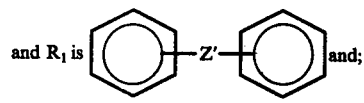

Z' being selected from $-\overset{O}{\underset{\|}{C}}-$, and $-SO_2-$.

Representative diamines which are suitable for the present invention are:
3,3'-diaminobenzophenone
3,4'-diaminobenzophenone
4,4'-diaminobenzophenone
3,5-diaminobenzophenone
3,3'-diaminodiphenyl sulfone
3,4'-diaminodiphenyl sulfone
4,4'-diaminodiphenyl sulfone.

Typical dianhydrides which are suitable for use in this invention are:
3,3',4,4'-benzophenone tetracarboxylic acid dianhydride
bis(3,4-dicarboxyphenyl)ether dianhydride
bis(3,4-dicarboxyphenyl)sulfone dianhydride
bis-4-(3',4'-dicarboxyphenoxy)sulfone dianhydride
bis(3,4-dicarboxyphenyl)dimethylsilane dianhydride
1,4-bis-(3',4'-dicarboxyphenyl dimethylsilyl)benzene dianhydride.

The above-described process for preparing the polyimide adhesives is significantly different from the usual procedure for polyimide preparation. The primary difference is the necessity of using ether solvents, in contrast to the usual solvents of the N,N-dialkylcarboxyamide class, e.g., N,N-dimethylformamide, N,N-dimethylacetamide, and N-methyl-2-pyrrolidone. The use of the proper ether solvents not only leads to molecular weights of the polyamic-acid prepolymers which result in superior bonding properties, but the ether solvents are more readily volatilized from the polymer at the optimum states of cyclization of the polyamic-acids to the polyimides. In contrast, the solvents of the N,N-dialkylcarboxylamide class complex tenaciously with the polyamic-acid intermediates and are usually not volatilized from the polymer until an excessive degree of conversion of the polymer to the cyclic polyimide form has occurred. This diminishes the extent to which those chemical groups in the polyamic-acid intermediates responsible for bonding can do so with the substrates. Another advantage in the use of ether solvents is their lower degree of toxicity to humans, in contrast to the well known cumulative toxic effects of N,N-dialkylcarboxylamides.

Measurements of the contact angles of the polymer solutions on the metallic substrates have disclosed that those polyamic-acid solutions in ether solvents give smaller contact angles than do the corresponding polyamic-acids dissolved in N,N-dialkylcarboxylamides solvents. The smaller contact angles thus infer that the ether solvents have superior wetting power, and consequently, result in improved bonding to the metal.

The invention and its advantages will be illustrated more completely by the following specific examples. Lap shear tensile strength measurements were conducted according to ASTM D-1002 (CTM No. 26). Titanium lap shear specimens were fabricated from four-finger panels. Each finger test joint specimen was 1 inch wide, and the bonded overlap was ½ inch. The titanium finger panels were fabricated from 6-aluminum 4-vanadium titanium alloy, nominally 0.050 inch thick. The metal panels were cleaned using a standard Pasa-Jel cleaning procedure. THe individual lap shear specimens were separated from the four-finger panel after bonding.

SPECIFIC EXAMPLES

EXAMPLE I

A solution of 84.8 grams (0.40 mole) of p,p'-diaminobenzophenone (p,p'-DABP) in 900 milliters of tetrahydrofuran (THF) was prepared in a 2-1 Erlenmeyer flask. The solution was stirred with a magnetic stirring bar and 128.8 grams (0.40 mole) of 3,3',4,4'-benzophenone tetracarboxylic acid dianhydride (BTDA), was added as a granular solid. After the dianhydride had dissolved and reacted, a solution of 40 ml of water and 60 ml of THF was added. The resulting viscous polymer solution contained 20% by weight of the BTDA-p,p'-DABP polyamic-acid. A-1100 glass fabric (112 finish) was dipped into the polymer solution and the solvent was allowed to evaporate in air. The fabric was heated in an air oven for ½ hour at 65° C., then at 100° C for 10 minutes.

A pair of precleaned panels, containing four 1 inches × 5 inches lap shear specimens and made from 50 mil 6-4 titanium alloy (6 parts aluminum and 4 parts vanadium per 100 parts titanium alloy) were painted with the neat polymer solution so as to give ½ inch overlaps. After solvents was allowed to evaporate, a one-half inch wide strip of the glass-adhesive tape was placed between the overlapped panels and the specimens were assembled in a bonding jig in such a manner as to hold the specimens securely while being bonded. The assembly was placed in a hydraulic press and 150 psi pressure was applied. The temperature, which was monitored by a thermocouple spotwelded next to the bondline of one of the specimens, was increased up to 275° C. over a period of 45 minutes. The temperature of the press was held at 275° C. for 1 hour, while the pressure was maintained at 150 psi. The heat was turned off and the press was allowed to cool, under pressure, to less than 100° C. At that time, the bonded panel was removed from the press and the bonding jig, the individual lap shear specimens were separated with a metal shearer, and the lap shear strengths were determined according to the procedure for ASTM D-1002. The four specimens tested gave an average of 2790 pounds per square inch lap shear strength. Breaks were predominantly cohesive in nature.

A 25% solution of the same BTDA-p,p'-DABP polyamic-acid was prepared in N,N-dimethyl formamide, one of the highly polar, aprotic solvents more customarily employed for the polymerization of such polyimide precursors. Use of this solution for bonding titanium lap shear specimens using a bonding cycle similar to that described above for THF gave an average lap shear strength of 640 psi, and the prevalence of large areas of adhesive failure in the broken specimens was noted.

A similar bonding testing a 15% solution of BTDA-p,p'-DABP polyamic-acid in N,N-dimethylacetamide (DMAC) gavesan average of 1990 psi lap shear strength, with a mixture of adhesive and cohesive bonding failure.

EXAMPLE II

An 18% solution of a polyimide precursor from BTDA and a diamine, m,m'-diaminbenzophenone (m,m'-DABP), isomeric to p,p'-DABP, was prepared in bis(2-methoxyethyl) ether. This solvent, also known as diglyme, is simila to THF in its solvent properties, but is considerably higher boiling (162° C.) then tetrahydrofuran (64° C.). The polymerization was performed as follows:

A mixture of 7.07g (0.033 mole) of m,m'-diaminobenzophenone (m,m'-DABP) and 10.7g (0.033 mole) of 3,3',4,4'-benzophenone tetracarboxylic acid dianhydride were mixed in a house hold blender. To the mixture was added 80 ml. of diglyme and the mixture was stirred. After 15 minutes, a very viscous mass had precipitated from solution. A total of 5 ml. of ethanol was added in ½ ml. portions to redissolve the polymer. The resulting viscous polymer solution, containing 18% of the polyamic-acid by weight, was used for bonding titanium lap shear specimens, using the following bonding cycle. A pair of precleaned four-finger vanadium alloy panels were painted with the above polymer solution so as to give one-half inch overlaps. After the solvent was allowed to evaporate, the specimens were assembled in a bonding jig in such a manner as to hold the specimens securely while being bonded. The assembly was placed in a hydraulic press and 40 psi pressure was applied. The temperature, which was monitored by a thermocouple spotwelded next to the bondline of one of the specimens, was increased at a rate of 4°–5° C/miin. up to 300° C. The temperature of the press was held at 300° C. for 50 minutes, while the pressure was maintained at 40 psi. The heat was turned off and the press was allowed to cool, still holding 40 psi pressure, to less than 100° C. At that time, the bonded panel was removed from the press and the bonding jig, the individual lap shear specimens were separated with a metal cutter, and the lap shear strengths were determined.

When a similar polymerization was performed at 10% solids concentration in dioxane, the insoluble polymer did not redissolve when about 2% ethanol was added. Therefore, the superanatent dioxane was decanted off, and 12 ml. of MDAc was added to redissolve the polymer. A clear polymer solution was obtained, and this was used for bonding.

Test specimens were also prepared using BTDA-m,m'-DABP polyamic-acid solutions prepared in two of the aprotic, highly polar amide solvents, DMF and N-methyl-2-pyrrilidone (NMP).

The following table compares the results of the lap shear tests.

TABLE I

| Ti-Ti Lap Shear Strengths with BTDA-m,m'-DABP | | |
|---|---|---|
| Polymerization Solvent | inh. (0.5%, 35° C) | Lap Shear Strength (psi) |
| DMF | .20 | 410 |
| DMAc | .60 | 2582 |
| NMP | .52 | 1220 |
| Dioxane + DMAc | .33 (DMac) | 2900 |
| Diglyme | .36 | 4350 |

The above results indicate not only the superior bonding strengths obtained using the ether solvent process, but also shows that the preparation of the polymer in an ether solvent, followed by redissolution in a customary amide solvent (MDAc), improves the adhesion in comparison to the bonding achieved using an amide polymerization solvent.

EXAMPLE III

This sample illustrates the compatability of adhesive resins prepared by the ether process with the customary agents, such as fillers and supports, used for formulating adhesives.

The polymer solutions of BTA-m,m'-DABP in diglyme prepared as described in Example II was coated onto A-1100 glass fabric sufficient to give a tape with good coverage of polymer resin after drying at room temperature. The solution was also mixed with 325 mesh (Alcan MD 105) aluminum powder in a quantity sufficient to give a formulation containing 70% by weight of aluminum (based on dry weight of the resin9 which was coated in a similar fashion onto glass fabric.

Bonding of titanium with the neat polymer solution, the polymer on the glass fabric support, and the glass fabric-supported aluminum-polymer formulation gave the results in Table II.

TABLE II

| Lap Shear Strengths for Titanium Bonded with BTDA-m,m'-DABP Formulations | |
|---|---|
| Formulation | Lap Shear Strength (psi) |
| Neat resin | 4350 |
| Neat resin-A-1100 glass fabric | 4550 |
| 70% aluminum -30% resin on A-1100 glass-fabric | 4110 |

EXAMPLE IV

The potential utility of the adhesives of this process for bonding materials for use of elevated temperatures was demonstrated by this experiment.

Lap shear strengths of titanium bonded with the diglyme solution of BTDA-m,m'-DABP prepared in Example II, were determined at several temperatures. The results were as follows:

| Test Temperatures | Lap Shear Strength (psi) |
|---|---|
| 25° C. | 4350 |
| 210° C. | 2500 |
| 250° C. | 950 |

The foregoing specific examples are exemplary and are not to be considered as exhaustive, but merely to illustrate applicants invention without serving as limitations thereon.

After imidization has been accomplished by the thermal bonding step described, all of the polyimide adhesives made in the specific examples described hereinbefore were found to be insoluble in ethers and other known organic solvents normally expected to serve as polyimide solvents such as, N,N-dimethyl-formamide (DMF), N-methylpyrollidone (NMP), and dimethylacetamide.

Obviously there are many variations and modifications of the present invention in the light of the above teachings. It is therefore to be understood that within the scope of the appended claims the invention may be practiced otherwise than as specifically described.

What is claimed as new and desired to be secured by Letters Patent of the United States is:

1. A method for preparing an adhesive solution comprising:
   reacting an aromatic dianhydride with an approximately equimolar quantity of an aromatic diamine,
   the reactants being previously dissolved in a liquid selected from the group consisting of 1,2-dimethoxyethane, bis(2-methoxyethyl)ether, 1,2,bis(2-methoxyethoxy)ethane and bis-[2-(2-methoxyethoxy) ethyl]ether.

2. The method of claim 1 wherein the diamine is selected from the grou pf diamines consisting of:
   3,3'-diaminobenzophenone,
   3,4'-diaminobenzophenone,
   4,4'-diaminobenzophenone,
   3,5-diaminobenzophenone,
   3,3'-diaminodiphenyl sulfone,
   3,4'-diaminodiphenyl sulfone, and
   4,4'-diaminodiphenyl sulfone.

3. The method of claim 1 wherein the dianhydride is selected from the group of dianhydrides consisting of:
   3,3'4,4'-benzophenone tetracarboxylic acid dianhydride,
   bis(3,4-dicarboxyphenyl)ether dianhydride,
   bis(3,4-dicarboxyphenyl)sulfone dianhydride
   bis-4-(3',4'-dicarboxphenyoxy)sulfone dianhydride,
   bis(3,4-dicarboxphenyl)dimethysilane diandride, and
   1,4-bis-(3',4'-dicarboxylphenyl dimethylsilyl)benzene dianhydride.

4. The method of claim 1 wherein the initial reactant product is an aromatic polyimide-acid having reccuring units of the formula:

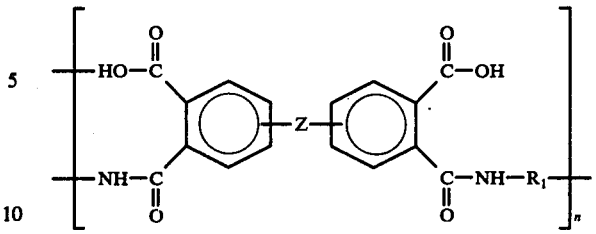

where
Z is selected from the group consisting of

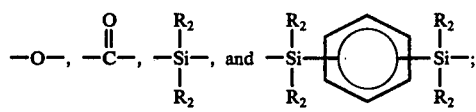

$R_2$ being from alkyl and aryl groups;
$R_1$ is

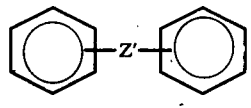

and,
Z' is selected from the group consisting of

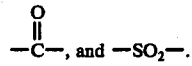

5. The method of claim 4 including the further steps of applying the adhesive solution to substrate surfaces, allowing some or all of the solvent to evaporate, assembling together the treated substrate surfaces and heating the polyamide-acid in the temperature range of 200° C. to 300° C. for at least one hour to complete the evaporation of the solvent and to conver the polyamide-acid into a thermally resistant cyclic polyimidae having recurring units of the formula:

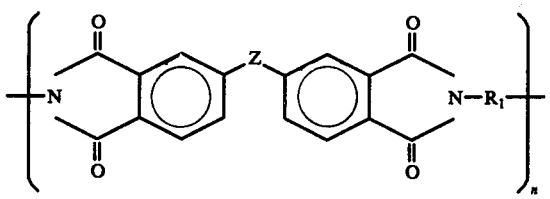

6. A high molecular weight polyimide adhesive resin bond prepared according to the method of claim 5, and having the inherent physical property characteristic of being insoluble in ethers and other organic solvents.

* * * * *